United States Patent Office 2,927,114
Patented Mar. 1, 1960

2,927,114
3,3-DISUBSTITUTED-2,6-PIPERAZINEDIONES

Patrick T. Izzo, Pearl River, N.Y., and Sidney Robert Safir, River Edge, N.J., assignors to American Cyanamid Company, New York, N.Y., a corporation of Maine No Drawing. Application November 14, 1958
Serial No. 773,845
9 Claims. (Cl. 260—268)

This invention relates to new organic compounds and more particularly is concerned with novel 3,3-disubstituted-2,6-piperazinediones which may be represented by the following general formula:

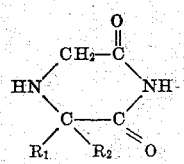

wherein $R_1$ and $R_2$ are lower alkyl radicals of more than one carbon atom with the proviso that $R_1$ may not equal $R_2$. Suitable lower alkyl radicals are ethyl, propyl, butyl, isobutyl, pentyl, hexyl, etc.

The novel compounds of this invention are useful hypnotics and are preferably administrable orally but may also be administered by intravenous, intramuscular or intraperitoneal injection. The hypnotic properties of the new compounds are evidenced by their ability to induce sleep. The compounds have been found to be effective in dosages of from 25 milligrams to 500 milligrams per kilogram of body weight.

It is most surprising to find that the new compounds are effective hypnotics when the prior art related compound 3,3-dimethylpiperazinedione disclosed in U.S. Patent No. 2,750,383 to S. R. Safir et al. possesses no such activity.

The new compounds may be prepared by hydrolyzing a N-(1-cyano-1-alkylalkyl) glycine ethyl ester to the corresponding N-(1-carbamoyl-1-alkylalkyl) glycine ethyl ester by treatment with polyphosphoric acid at room temperature, that is 25–30° C. The compound so prepared is then cyclized to the final 3,3-disubstituted-2,6-piperazinedione by treatment with polyphosphoric acid at temperatures ranging from about 70° C. to about 100° C. Alternatively, the original starting material may be converted directly to the final product by treatment with polyphosphoric acid at temperatures ranging from about 70° C. to about 100° C. Alternatively, the corresponding N-(1-carbamoyl-1-alkylalkyl) glycine methyl ester hydrochloride may be condensed to form the final product by treatment with an alkali metal lower alkoxide, i.e. sodium methoxide at temperatures ranging from 0° to 50° C.

The reaction using polyphosphoric acid may be schematically illustrated by the following equation:

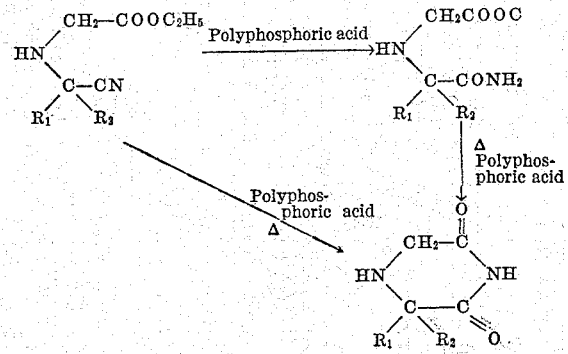

wherein $R_1$ and $R_2$ have the meaning hereinbefore given.

The intermediate N-(1-cyano-1-alkylalkyl) glycine ethyl ester may be prepared by reacting a suitable ketone

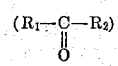

with aqueous methanol, potassium cyanide and glycine ethyl ester hydrochloride, or alternatively with liquid hydrogen cyanide and glycine ethyl ester.

The invention will be described in greater detail in conjunction with the following specific examples.

EXAMPLE 1

*Preparation of N-(1-cyano-1-ethyl-4-methylpentyl) glycine ethyl ester*

To a cold solution of 22.8 grams of potassium cyanide in 35 milliliters of water was added a solution of 49 grams of glycine ethyl ester hydrochloride in 50 milliliters of water. To this cooled, well-stirred mixture was added rapidly a solution of 45 grams of ethyl isopentyl ketone in 75 milliliters of methanol. Stirring and cooling under running water were continued for four hours and then stirring at room temperature was prolonged for another 20 hours. The organic phase was separated and dissolved in 100 milliliters of ether. The ethereal solution was washed with water three times and dried with anhydrous sodium sulfate. Evaporation of the ether left 55.5 grams of nearly colorless oil which consisted essentially of N-(1-cyano-1-ethyl-4-methylpentyl) glycine ethyl ester.

EXAMPLE 2

*Preparation of N-(1-carbamoyl-1-ethyl-4-methylpentyl) glycine hydrochloride*

50 grams of N-(1-cyano-1-ethyl-4-methylpentyl) glycine ethyl ester was dissolved in 500 milliliters of ice-cold, fuming hydrochloric acid. The solution was allowed to remain at room temperature for 24 hours and then was evaporated in vacuo at 45° to a thick colorless syrup. This material was dissolved in 100 milliliters of warm, absolute alcohol and the solution was filtered. To the filtrate was added 50 milliliters of anhydrous ether and the resulting solution was allowed to stand at 5° for several hours. The precipitated, crystalline product was filtered, washed, and dried. The yield was 23.6 grams. The compound N-(1-carbamoyl-1-ethyl-4-methylpentyl) glycine hydrochloride melted with decomposition at 115–120° C.

EXAMPLE 3

*Preparation of N-(1-carbamoyl-1-ethyl-4-methylpentyl glycine methyl ester hydrochloride*

20 grams of N-(1-carbamoyl-1-ethyl-4-methylpentyl) glycine hydrochloride was dissolved in 1000 milliliters of anhydrous 3% methanolic hydrogen chloride (by weight). The solution was allowed to remain at room temperature for 24 hours and then evaporated to dryness at reduced pressure. The white, solid residue was dissolved in 50 milliliters of methanol and 75 milliliters of ether was added. The solution was allowed to remain at 5° overnight. The crystalline product, N-(1-carbamoyl-1-ethyl-4-methylpentyl) glycine methyl ester hydrochloride, weighed 14.5 grams and melted with decomposition at 161–164° C.

EXAMPLE 4

*Preparation of 3-ethyl-3-isopentyl-2,6-piperazinedione*

14 grams of N-(1-carbamoyl-1-ethyl-4-methylpentyl)

glycine methyl ester hydrochloride was dissolved in 550 milliliters of absolute methanol. To this solution was added 5.7 grams of sodium methoxide dissolved in 50 milliliters of absolute methanol. The sodium methoxide was washed in with an additional 50 milliliters of methanol. The resulting solution was allowed to remain at room temperature for 45 minutes and then was evaporated at reduced pressure to a residue. To this was added 50 milliliters of 1 N HCl followed quickly by 50 milliliters of chloroform. The mixture was shaken vigorously and the chloroform phase separated. The aqueous phase was again extracted with 50 milliliters of chloroform. The combined chloroform extract was washed with water, dried with sodium sulfate and evaporated in vacuo to a colorless, viscous oil. This product was crystallized from 25 milliliters of petroleum ether giving 8.2 grams of crystalline 3-ethyl-3-isopentyl-2,6-piperazinedione melting at 53–55°. Addition of 3% anhydrous methanolic HCl to a sample of the free base gave the hydrochloride salt which was recrystallized from a 50–50 mixture of methanol-ether. Its melting point was 195–210° C. dec.

EXAMPLE 5

*Preparation of 3-ethyl-3-propyl-2,6-piperazinedione hydrochloride*

A mixture of 6.4 grams of N-(1-cyano-1-ethylbutyl) glycine ethyl ester (prepared following the procedure of Example 1 but using ethylpropyl ketone) and 75 grams of polyphosphoric acid was stirred and heated on the steam-bath for 30 minutes. The mixture was cooled and mixed with 200 grams of ice. The resulting solution was brought to about pH 6 with 6 N NaOH and finally neutralized by the addition of powdered sodium bicarbonate. The solution was extracted twice with 50 milliliter portions of ether. The ether extract was dried with anhydrous sodium sulfate and then treated with anhydrous hydrogen chloride gas. The precipitated hydrochloride of 3-ethyl-3-propyl-2,6-piperazinedione weighed 1.2 grams and melted at 202–205° C. dec.

EXAMPLE 6

*Preparation of 3-ethyl-3-pentyl-2,6-piperazinedione*

N-(1-cyano-1-ethylhexyl) glycine ethyl ester was prepared by reacting ethyl glycinate hydrochloride with ethylpentyl ketone in liquid hydrogen cyanide. Following the procedure of Example 2, this compound was hydrolyzed with fuming hydrochloric acid to produce N-(1-carbamoyl-1-ethylhexyl) glycine hydrochloride. Following the procedure of Example 3, this compound was esterified with acid methanolic HCl to produce N-(1-carbamoyl-1-ethylhexyl) glycine methyl ester hydrochloride which was cyclized with sodium methoxide following the procedure of Example 4. The hydrochloride of 3-ethyl-3-pentyl-2,6-piperazinedione melted at 196–199° C. dec. and the free base melted at 38–40° C.

EXAMPLE 7

*Preparation of 3-ethyl-3-hexyl-2,6-piperazinedione*

Following the procedure of Example 1, N-(1-cyano-1-ethylheptyl) glycine ethyl ester was prepared from 3-nonanone, potassium cyanide and glycine ethyl ester hydrochloride. The resulting compound was hydrolyzed with fuming hydrochloric acid as described in Example 2 to produce N-(1-carbamoyl-1-ethylheptyl) glycine hydrochloride. This latter compound was esterified with acid methanolic HCl as described in Example 3 to form N-(1-carbamoyl-1-ethylheptyl) glycine methyl ester hydrochloride which was cyclized with sodium methoxide as described in Example 4 to produce 3-ethyl-3-hexyl-2,6-piperazinedione which was recrystallized from petroleum ether and melted at 55.5–56° C.

EXAMPLE 8

*Preparation of 3-ethyl-3-butyl-2,6-piperazinedione*

Following the procedure of Example 1, N-(1-cyano-1-ethylpentyl) glycine ethyl ester was prepared by reacting 3-heptanone with potassium cyanide and glycine ethyl ester hydrochloride. The resulting compound was hydrolyzed with fuming hydrochloric acid as described in Example 2 to produce N-(1-carbamoyl-1-ethylpentyl) glycine hydrochloride which was esterified with anhydrous methanolic hydrogen chloride as described in Example 3 to produce N-(1-carbamoyl-1-ethylpentyl) glycine methyl ester hydrochloride. The latter product was cyclized with sodium methoxide in absolute methanol as described in Example 4 to produce 3-ethyl-3-butyl-2,6-piperazinedione which was recrystallized from benzene-petroleum ether to give a product melting at 66–67° C.

EXAMPLE 9

*Preparation of 3-ethyl-3-propyl-2,6-piperazinedione*

N-(1-cyano-1-ethylbutyl) glycine ethyl ester (prepared following the procedure of Example 1 using 3-hexanone KCN and glycine ethyl ester hydrochloride) was hydrolyzed with fuming hydrochloric acid as described in Example 2 to produce N-(1-carbamoyl-1-ethylbutyl) glycine hydrochloride. This latter compound was esterified with anhydrous methanolic hydrogen chloride as described in Example 3 to produce N-(1-carbamoyl-1-ethylbutyl) glycine methyl ester hydrochloride, which was cyclized with sodium methoxide as described in Example 4 to produce 3-ethyl-3-propyl-2,6-piperazinedione which, when recrystallized from benzene-petroleum ether, melted at 81–82° C.

EXAMPLE 10

*Preparation of 3-propyl-3-pentyl-2,6-piperazinedione hydrochloride*

N-(1-cyano-1-propylhexyl) glycine ethyl ester was prepared from 4-nonanone, potassium cyanide and glycine ethyl ester hydrochloride according to the procedure of Example 1. This compound was treated with polyphosphoric acid as described in Example 5. The product isolated as the hydrochloride salt, was recrystallized from a 50–50 mixture of methanol and ether and melted at 187–198° C. dec.

We claim:

1. A compound selected from the group consisting of 3,3-disubstituted-2,6-piperazinediones of the formula:

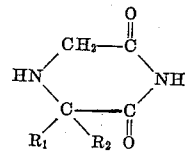

wherein $R_1$ and $R_2$ are different lower alkyl radicals each of more than one carbon atom and the non-toxic acid addition salts thereof.

2. 3-ethyl-3-hexyl-2,6-piperazinedione.
3. 3-ethyl-3-isopentyl-2,6-piperazinedione.
4. 3-ethyl-3-pentyl-2,6-piperazinedione.
5. 3-propyl-3-pentyl-2,6-piperazinedione.
6. 3-ethyl-3-butyl-2,6-piperazinedione.
7. 3-ethyl-3-propyl-2,6-piperazinedione.
8. The process of preparing 3,3-disubstituted-2,6-piperazinediones of the formula:

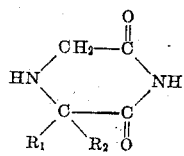

wherein $R_1$ and $R_2$ are different lower alkyl radicals each of more than one carbon atom and the non-toxic acid addition salts thereof which comprises hydrolyzing a N-(1-cyano-1-alkylalkyl) glycine ethyl ester of the formula:

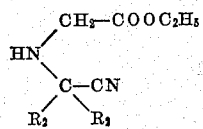

wherein $R_1$ and $R_2$ have the meaning hereinbefore given with polyphosphoric acid at a temperature ranging from about 25° C. to about 100° C.

9. The process of preparing 3,3-disubstituted-2,6-piperazinediones of the formula:

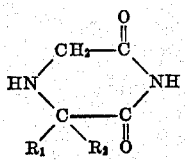

wherein $R_1$ and $R_2$ are different lower alkyl radicals each of more than one carbon atom and the non-toxic acid addition salts thereof which comprises condensing a N-(1-carbamoyl-1-alkylalkyl) glycine methyl ester hydrochloride with an alkali metal lower alkoxide at a temperature of from 0° C. to 50° C.

References Cited in the file of this patent

UNITED STATES PATENTS 2,750,383   Safir et al. _____ June 12, 1956

FOREIGN PATENTS 779,317   Great Britain _____ July 17, 1957